United States Patent [19]
Masrrodonato et al.

[11] 3,732,616
[45] May 15, 1973

[54] METHOD OF MAKING END FRAME STRUCTURES FOR ELECTRIC MOTORS

[75] Inventors: Alfred Masrrodonato; Kurt Porter, both of Owosso; Robert R. Rhoads, Corunna, all of Mich.

[73] Assignee: Universal Electric Company, Owasso, Mich.

[22] Filed: Feb. 25, 1971

[21] Appl. No.: 118,596

Related U.S. Application Data

[62] Division of Ser. No. 740,338, June 26, 1968, Pat. No. 3,567,973.

[52] U.S. Cl. .................29/596, 29/510, 29/521, 310/42, 310/89
[51] Int. Cl....H02k 15/00, H02k 15/14, H02k 15/16
[58] Field of Search.................29/596, 510, 521; 310/42, 89, 258

[56] References Cited

UNITED STATES PATENTS

| | | |
|---|---|---|
| 3,445,692 | 5/1969 | Kato.....................................310/42 |
| 3,081,411 | 3/1963 | Wiley..................................310/89 X |
| 3,289,018 | 11/1966 | Schaefer............................310/89 X |
| 3,321,654 | 5/1967 | Allendorph ........................310/258 |
| 2,701,318 | 2/1955 | Feiertag............................310/89 X |
| 3,463,949 | 8/1969 | Stone................................310/89 X |
| 3,419,957 | 1/1969 | Stone................................310/89 X |

*Primary Examiner*—Richard J. Herbst
*Assistant Examiner*—Carl E. Hall
*Attorney*—Barnes, Kisselle, Raisch & Choate

[57] ABSTRACT

In one form the electric motor comprises an improved frame which rotatably supports the rotor shaft. This frame consists of a circular shell which encircles the stator and two end members which engage into the inside of the shell and contain a bearing for supporting an end of the shaft. The shell has a plurality of notches at each end for receiving mating projections on the end member, thus securing the end member against relative rotational movement. The shell also has a plurality of slots in each end which serve to define a portion of the shell which can be deformed radially inward after assembly of the end members to secure the end members against axial movement.

6 Claims, 20 Drawing Figures

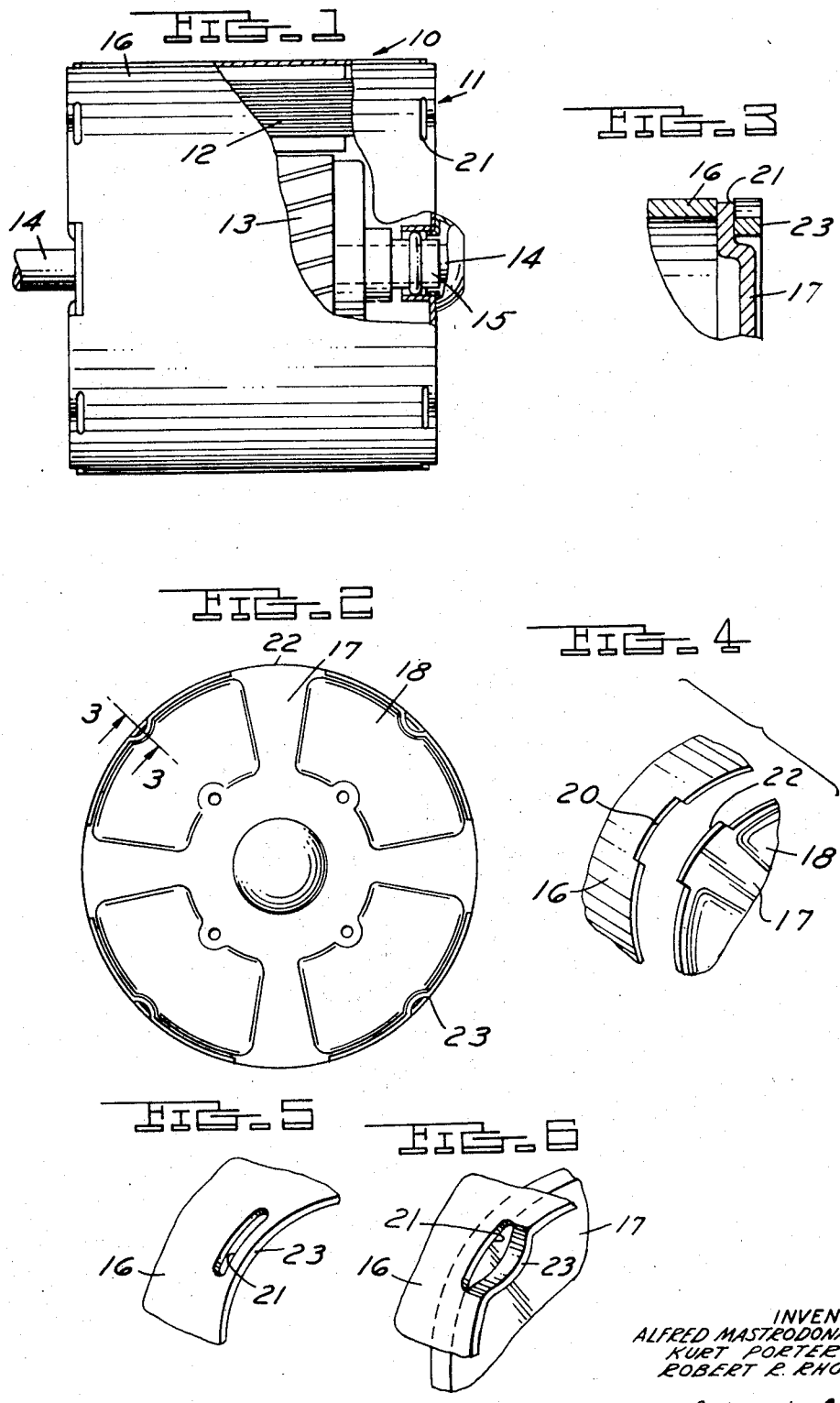

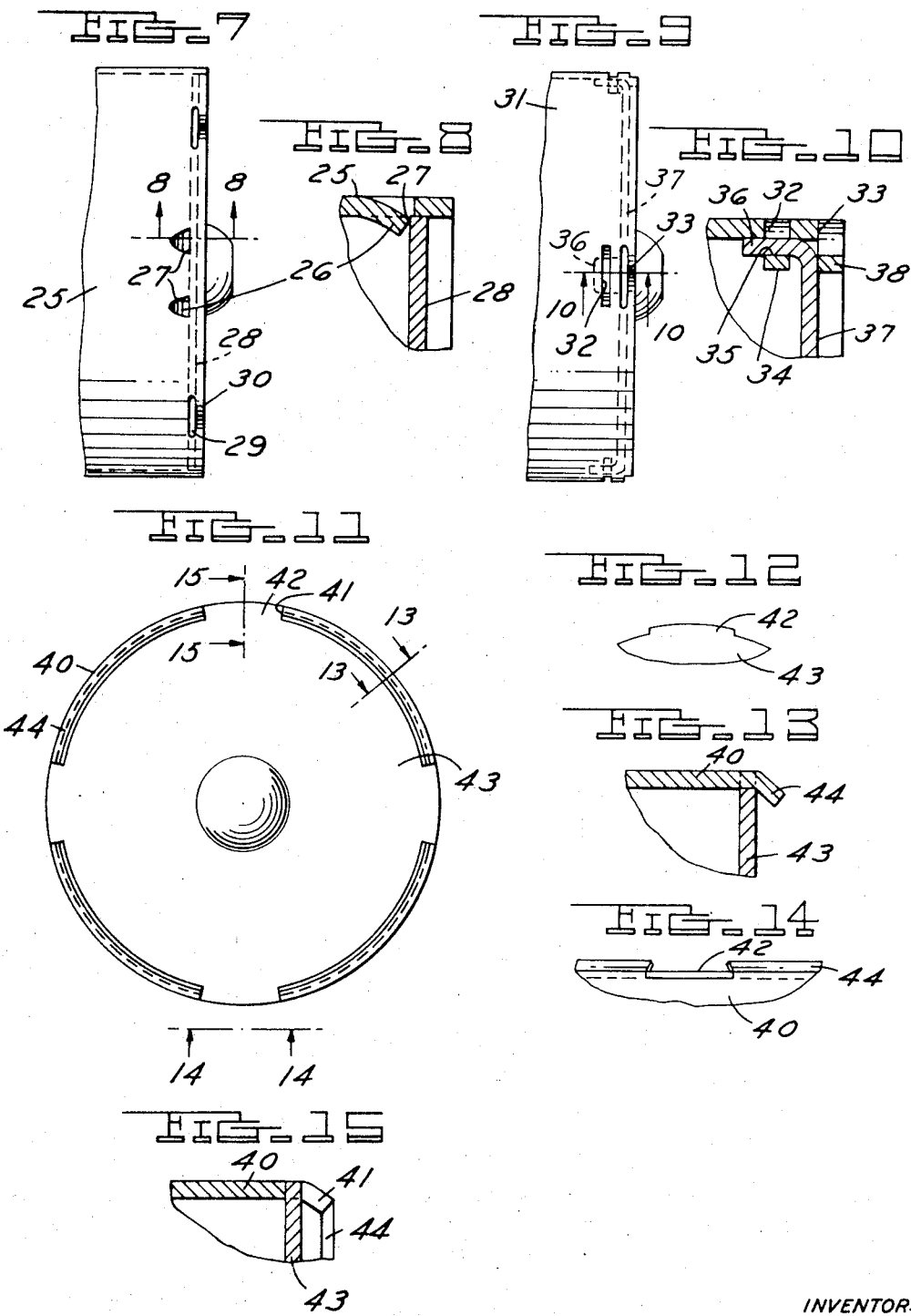

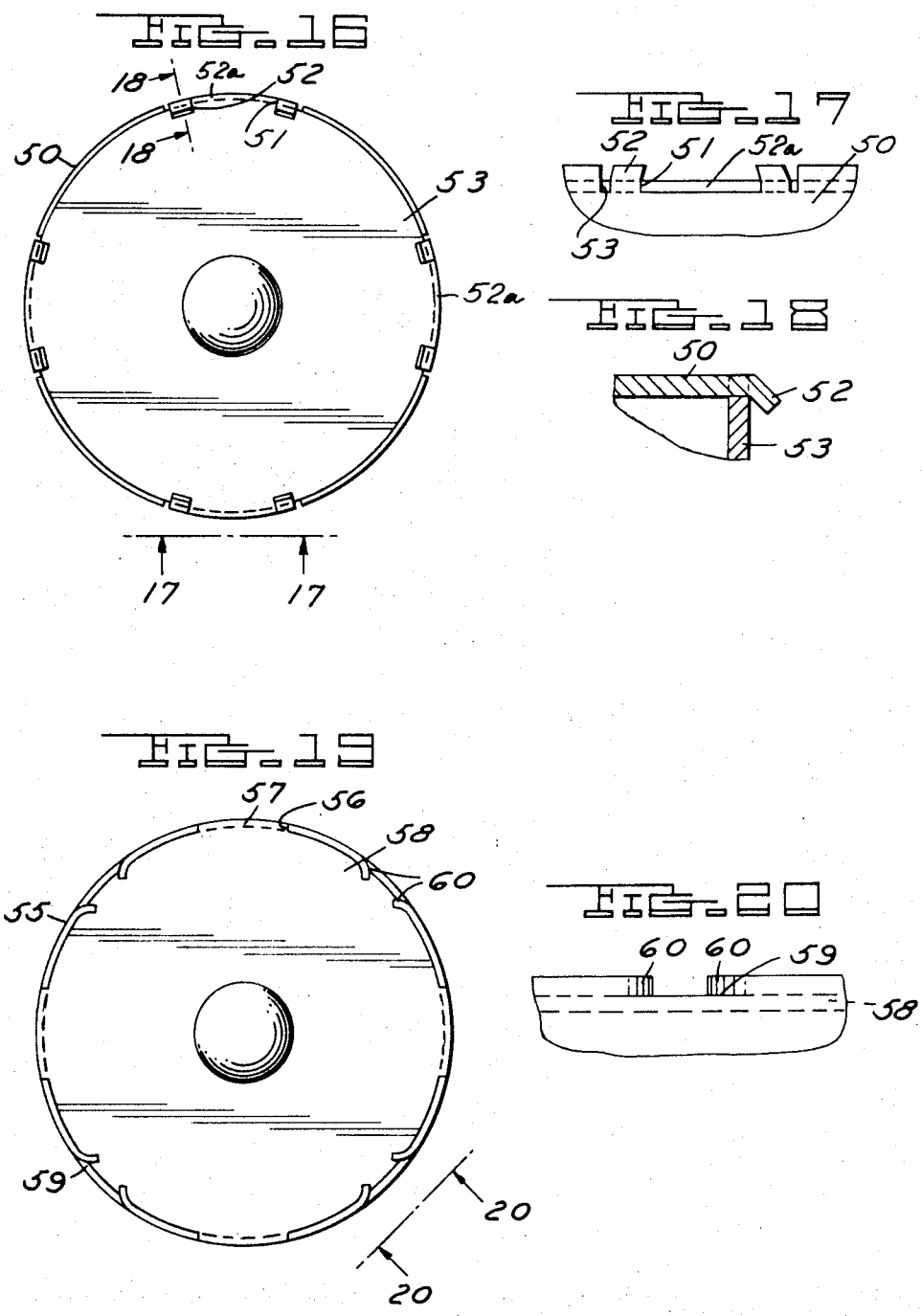

3,732,616

METHOD OF MAKING END FRAME STRUCTURES FOR ELECTRIC MOTORS

This application is a division of our application Ser. No. 740,338, filed June 26, 1968, now Pat. No. 3,567,973.

This invention relates to electric motors and more particularly to the construction of the frame or housing of an electric motor.

In the construction of electric motors it is customary to provide a cylindrical steel shell which encloses the stator and also to provide substantially flat circular end members or closures which support the bearings of the motor and hold them in concentric relationship to the stator. It is customary to provide such end members with a precision machined male rabbet which nests into a female rabbet machined into the cylindrical shell, thus providing the necessary precision location of the bearing. Close tolerance is necessary to center the rotor into stator and to hold the end closures perpendicular to the shell. The end members are held in position on the shell by bolts which extend through both end members and the full length of the cylindrical shell.

The cylindrical shells are made by rolling a flat piece of sheet metal and welding the resulting seam together. Because of the nature of the process, it is impossible to assure that the ends of the cylinder so formed will be perpendicular to the cylindrical axis. In fact, the sheet metal may deviate as much as one sixty-fourth of an inch from a single plane thus forming a mismatch at the circumferential meeting of the ends of the sheet metal. This resulting mismatch and non-perpendicularity can only be corrected by a costly machining operation.

There are several disadvantages to using bolts to hold the end members in place. First, because motors vary in length and because it is necessary to offer a large variety of bolt lengths for the motor for mounting purposes, an extremely large inventory of bolts must be maintained. Second, a hole must be provided in the stator for the bolt to pass through the stator. This creates an area of high reluctance to the passage of magnetic flux. This hole is also very difficult to keep free of integral insulation and varnish. Third, the bolt must be adequately insulated from the motor winding. This is done by either insulating the bolt, the winding, or by forming the winding such that there is an adequate air gap clearance to the bolt.

Among the objects of the invention are to provide a low cost accurate means of locating and aligning the end members of an electrical motor and to secure such members to the shell of the motor in a novel manner; to provide securing means such that the process can be reversed to provide for disassembly of the motor for repairs; to have the end members secured such that there can be no relative movement to the motor shell; to provide a securing means for the end members which does not require holes, slots, or notches in the stator and does not require special forming or insulating of either the winding or the securing means; to provide a securing means for the end members which will not require openings through either the end member or the shell which will remain open after the motor is assembled; to provide registering surfaces on the end members and shell which are not subject to distortion under impact loads.

In the Drawings

FIG. 1 is a part sectional, side elevational view of an electric motor embodying the invention.

FIG. 2 is an end view of the same.

FIG. 3 is a fragmentary sectional view on an enlarged scale taken along the line 3—3 in FIG. 2.

FIG. 4 is a fragmentary exploded perspective view of a portion of an electric motor shown in FIGS. 1—3.

FIG. 5 is a fragmentary perspective view of another portion of the electric motor prior to assembly.

FIG. 6 is a fragmentary perspective view showing a portion of the motor after assembly.

FIG. 7 is a fragmentary side elevational view of a modified form of an electric motor.

FIG. 8 is a fragmentary sectional view on an enlarged scale taken along the line 8—8 in FIG. 7.

FIG. 9 is a fragmentary side elevational view of a further modified form of electric motor.

FIG. 10 is a fragmentary sectional view on an enlarged scale taken along the line 10—10 in FIG. 9.

FIG. 11 is an end view of a further modified form of electric motor.

FIG. 12 is a fragmentary plan view of a portion of the motor shown in FIG. 11.

FIG. 13 is a fragmentary sectional view on an enlarged scale taken along the line 13—13 in FIG. 11.

FIG. 14 is a fragmentary view taken along the line 14—14 in FIG. 11.

FIG. 15 is a fragmentary sectional view on an enlarged scale taken along the line 15—15 in FIG. 11.

FIG. 16 is an end view of a further modified form of the invention.

FIG. 17 is a fragmentary view on an enlarged scale taken along the line 17—17 in FIG. 16.

FIG. 18 is a fragmentary sectional view on an enlarged scale taken along the line 18—18 in FIG. 16.

FIG. 19 is an end view of a further modified form of the invention.

FIG. 20 is a fragmentary view on an enlarged scale taken along the line 20—20 in FIG. 19.

Referring to FIG. 1, electric motor 10 embodying the invention comprises a frame 11 in which a stator 12 is fixed and a rotor 13 on a shaft 14 which is rotatably supported by bearings 15. The frame 11 comprises a cylindrical shell 16 and end members 17 which support the bearings 15.

The shell 16 is made from sheet metal that is formed into a cylinder from a rectangular blank and welded longitudinally at the abutting or overlapping edges of the blank.

After forming, the shell 16 is placed on an arbor to shape the shell so that its interior surface is accurately formed cylindrically to receive the stator 12. Each end member 17 is also made of sheet metal and may have embossed portions 18.

After the shell 16 is formed, circumferentially spaced notches 20 (FIG. 4) and slots 21 (FIG. 5) are accurately pierced in the shell in a single punching operation for each end or both ends at once so that the distance between the base of the notches 20 at opposite ends and the distance between the slots 21 at opposite ends are accurate longitudinally of the shell.

Each end member 17 is formed with radially outwardly extending portions 22 that engage the radial surfaces of the base of notches 20.

Since the base of each notch 20 is accurately positioned longitudinally of the shell, the end member is in turn located accurately axially with respect to the shell.

The engagement of the portions 22 with the sides of the notch 20 prevents circumferential movement of the end member.

The segments 23 defined by the slots 21 are then bent intermediate their ends as at FIGS. 2, 3 and 6 radially inwardly against the outer surface of the end member 17 to hold end members in position without the use of bolts, screws or other types of fasteners.

Since the end members 17 are accurately positioned circumferentially and axially with respect to the shells, the bearings supported thereby will also be accurately positioned so that the longitudinal axis of the rotor 13 may coincide with the longitudinal axis of the shell 16.

In the form of the invention shown in FIGS. 7 and 8, each end of cylindrical shell 25 has circumferentially spaced struck out portions 26 extending radially inwardly to define accurately positioned edges or radial surfaces 27 against which the end members 28 abut. The distance between portions 26 longitudinally is accurately defined. The periphery of each end member 28 is circular and the shell 25 is formed with circumferentially spaced slots 29, which are accurately located axially relative to one another as are the notches 21 in the previous form of the invention. This defines segments 30 that are bent radially inwardly and down against the outer surface of the end members 28 to hold the end members in position in the manner of the previous form of the invention.

In the form of the invention shown in FIGS. 9 and 10, shell 31 is formed with pairs of slots 32, 33, accurately positioned longitudinally relative to one another. In assembly, the slots 32 define segments 34 that are bent radially inwardly to form radial surfaces against which end members 37 abut and openings 35 are receiving axial projections 36 on the end members 37 to thereby locate the end members 37 circumferentially. The slots 33 define segments 38 that are bent radially inwardly against the outer surface of the end members 37 to hold the end members 37 in position as in the previous forms of the invention.

In the form of the invention shown in FIG. 11—15, the cylindrical shell 40 is formed with circumferentially spaced notches 41 defining radial surfaces for receiving radial projecting portions 42 of the end members 43 in a manner similar to the form of the invention shown in FIGS. 1–6. However, in this form of the invention, the portions 44 of the shell intermediate the notches 41 are bent radially inwardly over the edges of the end members 43 to hold the end members 43 in position (FIGS. 11, 13, and 15).

In the form of the invention shown in FIGS. 16–18, the cylindrical shell 50 is formed with notches 51 defining radial surfaces into which radially extending portions 52a of the end members 53 extend as in the forms of the invention shown in FIGS. 1–6 and 11–15. However, in this form, the portions 52 of the end of the shell adjacent the sides of the notches 51 are separated by slots 53 from the remainder of the periphery and bend inwardly (FIG. 18) against the outer surface of the end members 53.

In the form of the invention shown in FIGS. 19 and 20, cylindrical shell 55 has circumferentially spaced notches 56 defining radial surfaces against which radial portions 57 of the end member 58 abut as in the forms of the invention shown in FIGS. 1–6, 11–15 and 16–18. Other portions of the periphery of the shell 55 have circumferentially spaced slits 59 which define separated oppositely directed segments 60 that are bent inwardly against the outer surface of the end member 58.

In each of the forms of the invention, the end members are located axially by surfaces formed in the shell which surfaces are spaced from the outer edges of the shell that may not be accurate after the forming operation. In this manner, any inaccuracy of the outer edges is avoided in the location of the end members.

We claim:

1. In making an electric motor having a cylindrical shell and at least one end member closing an end of said shell, the method of aligning and attaching the end member to the shell which comprises forming a rectangular blank into a cylindrical open ended shell having a peripheral edge at one end, forming circumferentially extending slots at circumferentially spaced points spaced from the edge of said shell to define segments between the edge of said shell and said slots, forming circumferentially spaced radial surfaces on said shell spaced from the edge, forming circumferentially spaced radial surfaces on an end member for abutting said surfaces on said shell, bringing the surfaces of said end member into engagement with the surfaces of said shell, and thereafter deforming said segments radially inwardly against outer surfaces of said end member.

2. The method set forth in claim 1 wherein the step of forming said radial surfaces in said shell is achieved by providing notches in the peripheral edge of said shell.

3. The method set forth in claim 1 wherein the step of forming said radial surfaces on said shell is achieved by deforming portions of said shell radially inwardly at a point spaced from the edges of said shell.

4. The method set forth in claim 1 wherein said radial surfaces on said shell are formed by providing circumferentially spaced pairs of slots adjacent the edges of said shell to define segments, and thereafter deforming said last-mentioned segments radially inwardly to form the surfaces.

5. The method set forth in claim 4 including the step of forming axially extending projections in said end member and inserting said projections between the inner surface of said shell and said segments.

6. In making an electric motor having a cylindrical shell and end members closing the ends of said shell, the method of aligning and attaching the end members to the shell which comprises forming a rectangular blank into a cylindrical open ended shell having peripheral edges at each end thereof, forming circumferentially extending slots at circumferentially spaced points spaced from each edge of said shell to define segments between the edge of said shell and said slots, the distance between the slots at one end and the slots at the other end of said shell being accurately controlled, forming notches at circumferentially spaced points on each said edge of said shell to define radial surfaces, the longitudinal spacing between the notches at one end and the notches at the other end of said shell being accurately controlled, forming radially extending tabs on a pair of end members to define radial surfaces on said end members, bringing the radial surfaces of each said end member into engagement with the radial surfaces of an end of said shell, and thereafter deforming said segments radially inwardly against the outer surfaces of said end members.

* * * * *